United States Patent
Bussmann et al.

(10) Patent No.: US 8,798,916 B2
(45) Date of Patent: Aug. 5, 2014

(54) LOCATION BASED SERVICES WITH COMBINATORIAL DATA SOURCES

(75) Inventors: Alexander Bussmann, Kirkland, WA (US); Joseph Figueroa, Kirkland, WA (US); Thomas G. Phillips, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1105 days.

(21) Appl. No.: 12/233,628

(22) Filed: Sep. 19, 2008

(65) Prior Publication Data

US 2010/0076677 A1    Mar. 25, 2010

(51) Int. Cl.
G01C 21/00 (2006.01)
G09B 5/00 (2006.01)
H04W 4/00 (2009.01)
G06Q 50/00 (2012.01)
G06Q 30/00 (2012.01)

(52) U.S. Cl.
USPC ........... 701/411; 701/408; 701/410; 701/425; 701/433; 701/434; 701/516; 701/526; 342/357.31; 340/988; 340/995.21; 340/995.19

(58) Field of Classification Search
USPC ......... 701/200–210, 213, 217, 218, 408, 410, 701/411, 414, 425, 433, 434, 467, 491, 516, 701/526, 537; 340/988–990, 995.13, 340/995.21; 342/357.31, 357.41, 357.44, 342/357.48; 455/456.5, 456.1, 456.6
See application file for complete search history.

(56) References Cited

U.S. PATENT DOCUMENTS

| | | | |
|---|---|---|---|
| 6,484,092 B2 | 11/2002 | Seibel | |
| 6,941,223 B2 | 9/2005 | Schuessler | |
| 7,089,110 B2 | 8/2006 | Pechatnikov et al. | |
| 7,103,470 B2 | 9/2006 | Mintz | |
| 7,149,625 B2 | 12/2006 | Mathews et al. | |
| 7,184,886 B1 | 2/2007 | Krull et al. | |
| 7,356,405 B1 | 4/2008 | Nesbit | |
| 2003/0009281 A1* | 1/2003 | Whitham | 701/211 |
| 2003/0229446 A1* | 12/2003 | Boscamp et al. | 701/213 |
| 2005/0096840 A1 | 5/2005 | Simske | |
| 2005/0222764 A1 | 10/2005 | Uyeki et al. | |
| 2006/0149461 A1 | 7/2006 | Rowley et al. | |
| 2007/0174042 A1* | 7/2007 | Thompson | 704/3 |

OTHER PUBLICATIONS

Thales Navigation, "New Magellan RoadMate 760 Portable Vehicle Navigation Introduces Industry-First Audible Street Names", Jun. 21, 2005, pp. 4.
"TravelPilot 200 from Blaupunkt: Dynamic Navigation", Retrieved at<< http://www.blaupunkt.com/press/blob_pdf.asp?id=2239 >>, pp. 2, Mar. 2008.
"PTV and the World of Mobile Navigation", Retrieved at << http://www.ptvamerica.com/mobility/worldofnavigation.html>>, May 19, 2008, pp. 4.
"Personal Navigation Solutions", Retrieved at<< http://www.telematicsvalley.org/obj/docpart/1/161d5c0aef74fa6a1c4e5e90b36c5b78.pdf >>, pp. 15, 2006.

* cited by examiner

*Primary Examiner* — Adam Tissot
(74) *Attorney, Agent, or Firm* — John Jardine; Andrew Sanders; Micky Minhas

(57) ABSTRACT

A location based service using combinatorial data sources for routing and time information is disclosed. One embodiment comprises using a user location, a first data set from a first data source containing information related to a first waypoint, and a second data set from a second data source containing information related to a second waypoint to determine a tour of the first waypoint and the second waypoint. In this way, the embodiment may send the tour of the first waypoint and the second waypoint to a navigation device.

14 Claims, 3 Drawing Sheets

| DATA SOURCE/SCENARIO | SALESMAN | TIME MNGMT | LOGISTICS | TOURIST |
|---|---|---|---|---|
| USER LOCATION | X | X | X | X |
| USER PROFILE | | X | | X |
| CALENDAR DATA | X | X | | |
| SOCIAL NETWORKS | | | | X |
| USER RATINGS | | | | X |
| PREVIOUS ROUTES | X | | X | X |
| PREVIOUS DESTINATIONS | X | | X | X |
| EVENT INFO/UPDATES | X | X | X | X |
| TRAFFIC INFORMATION | X | X | X | X |
| CONTACTS LOCATION | X | X | X | X |

FIG. 3

LOCATION BASED SERVICES WITH COMBINATORIAL DATA SOURCES

BACKGROUND

Global Positioning System (GPS) receivers provide location information. A personal navigation device (PND) may use a GPS receiver to provide additional location information, for example, a PND may provide detailed maps depicting a user's location as well as longitude and latitude information. Recently, PNDs have been developed that also provide routing information from a current location to a desired destination. These devices typically use a street level map and a visual or audio guide instructing a user to turn right or turn left at street intersections to direct them to their desired destination.

Some personal navigation devices have been developed that respond to road or traffic conditions to determine a route to a destination, but these devices receive their data from a single source that is not related to one or more of their destinations. Further, current personal navigation devices responsive to traffic or road conditions only adjust routing information to a destination, and not through a sequence of locations.

SUMMARY

Accordingly, various embodiments for location based services using combinatorial data sources for routing and time information are described below in the Detailed Description. For example, one embodiment comprises using a user location, a first data set from a first data source containing information related to a first waypoint, and a second data set from a second data source containing information related to a second waypoint to determine a tour of the first waypoint and the second waypoint. In this way, the embodiment may send the tour of the first waypoint and the second waypoint to a navigation device. Other embodiments are described in the detailed description below and by the appended claims and their equivalents.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows a chart depicting a plurality of data sources that may be used in some example use cases.

DETAILED DESCRIPTION

Figure 1:
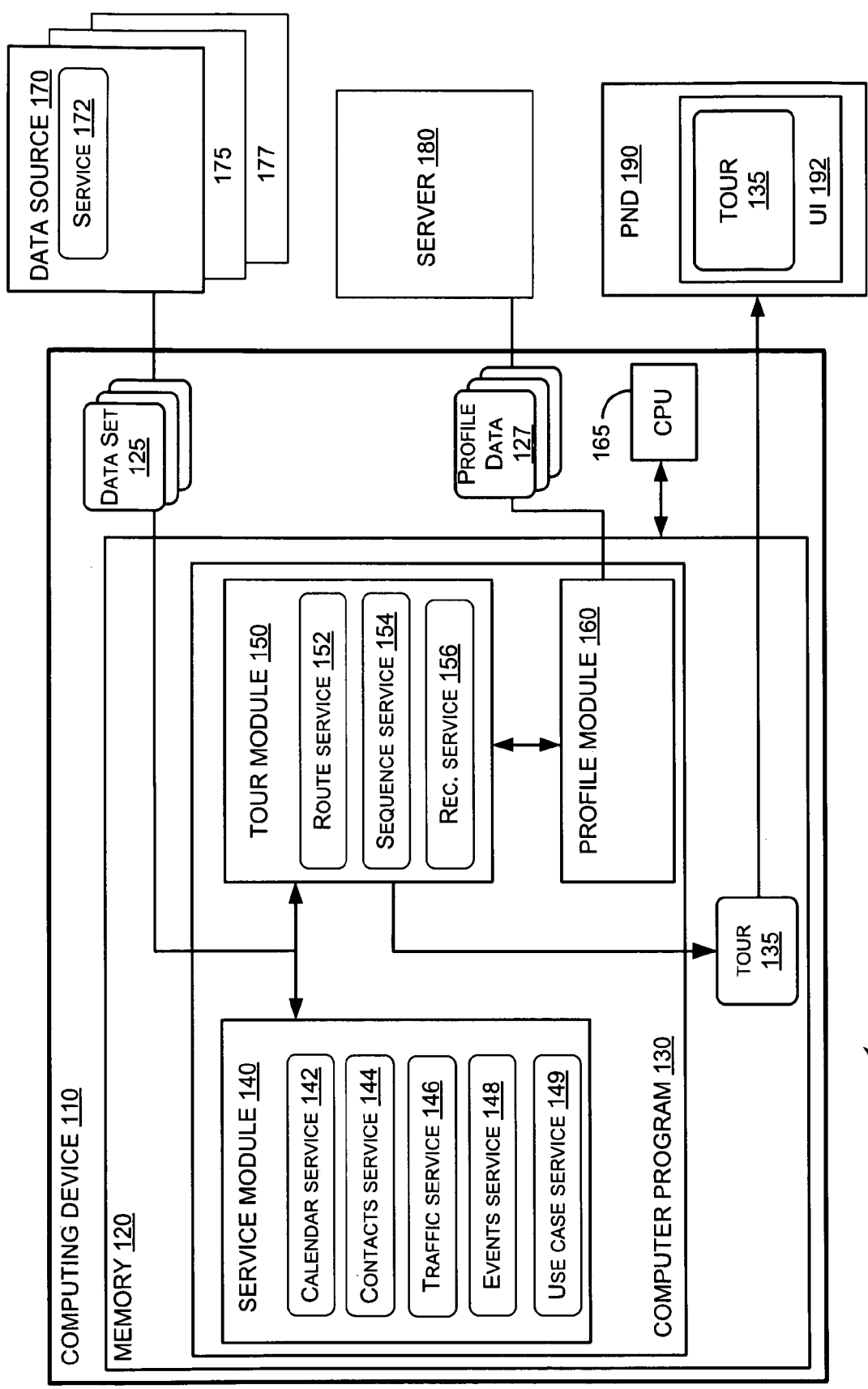
FIG. 1 shows an example of an embodiment for combining data sets from multiple data sources to generate a tour of waypoints.

FIG. 1 shows an example of an example environment 100 that combines data from multiple sources and generates a tour of a set of waypoints based on the data, in turn providing efficient routing and time management services. In an example system, a computing device 110 may have at least one input, a CPU 165, a memory 120, and a computer program 130. In the illustrated example, a system is in communication with a plurality of data sources such as data source 170, data source 175 and data source 177, a server 180 and a PND 190. Computing device 110 may further include a computer program 130 with a service module 140, a tour module 150, and a profile module 160.

In some embodiments the service module 140 may include a plurality of services each corresponding to a type of data on a data source 170. In the example depicted in FIG. 1, service module 140 includes a calendar service 142, a contacts service 144, a traffic service 146, an events service 148, and a use case service 149. Each service module may communicate with a service 172 operating on a remote data source 170, wherein the data source 170 provides a data set 125 that the tour module 150 uses to construct a tour 135. As an example, data source 170 may be a calendar containing availability information related to a first waypoint.

Events service 148 may run one or more of a plurality of events, including scheduled events, events of a known duration, events suggested by a user of PND 190 or created by a third party, or other events suitable as a destination within a tour of other waypoints, as non-limiting examples. Use case service 149 may be directed at a specific use cases, for example, a service designed for a salesman, a tourist, a delivery service, or other services or use cases that involve visiting multiple destinations. A salesman scenario and a tourist scenario are described below to describe in detail how a subject use case may be implemented by computer program 130.

Tour module 150 receives one or more data sets from data sources or from service module 140 and generates a tour 135. In the illustrated embodiment, tour module 150 includes a route service 152, a sequence service 154 and a recommendation service 156. Once a set of destinations or waypoints are determined, sequence service 154 may arrange the waypoints in a sequence, or otherwise prioritize the waypoints, in order to generate a tour 135. In some embodiments, the route service 152 may provide routing information to each waypoint in the tour 135. For example, after sequence service 154 generates a tour, route service 152 may generate an A-to-B mapping including directions for how to get to a waypoint, or a suggested route to a waypoint from a current location or from another waypoint.

In one example embodiment, the service module 140 may be configured to receive a plurality of data sets from a plurality of data sources using at least one of the plurality of services. Tour module 150 may receive a user location and a plurality of data sets from the service module 140. In the present example, the tour module 150 is configured to generate a tour 135 of the plurality of waypoints based on the plurality of data sets and the location of the user. Then, the system can send the tour 135 of the plurality of waypoints to a navigation device, for example PND 190, for example to be displayed in user interface (UI) 192. Additionally, in response to a change at one of the data sources, a data set 125 incorporating the change may be sent to the computing device 110 and the tour module 150 will then generate a new tour 135 of the plurality of waypoints based on the change. In some embodiments, wherein the sequence service generates the tour in part based on a mode of transportation of a user.

For example, tour module 150 may have a set of waypoints including waypoint A, waypoint B, and waypoint C and a delivery person may have packages to deliver to each waypoint. Prior to or during the deliveries, the service module 140 may query a calendar at each way point, wherein each calendar in this example is a data source 170. A recipient at waypoint A may have a schedule change reflected in their calendar, but may have another available time later in the same day to receive the delivery. Upon querying the calendars, one or more data sets may be retrieved and tour module 150 then may adjust the sequence of waypoints in the tour to allow delivery to waypoint A at a suitable time. Additional data may be sent with an updated tour 135 to a user, for example up to date traffic information, calendar data, etc.

In some embodiments profile module 160 may be in communication with the tour module 150, and the profile module 160 may be configured to generate a user profile containing information about user interests, and configured to provide additional waypoints that correspond to the information in the user profile. For example, profile module 160 may receive profile data 127 for a user from a remote server 180 and then provide media data that is related to the information in the user profile for any of the plurality of waypoints.

In some embodiments, the information in the user profile may be retrieved from at least one of a response to a survey filled out by a user, from a social networking account, or from a community rating data store. In one example, a user may provide authorization to access their account on a social networking site and a service may acquire the information from the site and use it in a user profile to find potential points of interest that may be suggested as potential waypoints in a tour 135 by tour module 150. Additional examples of information in the user profile may be locations previously visited, ratings from community rating web-sites, searches conducted by a user, news sources, product purchases, previous routes to or between waypoints, in certain areas, etc. For example, a service may retain a history of routes for a user or for a PND 190. In some examples the service may run on a PND 190, in computing device 110, on a server 180, etc.

Figure 2:
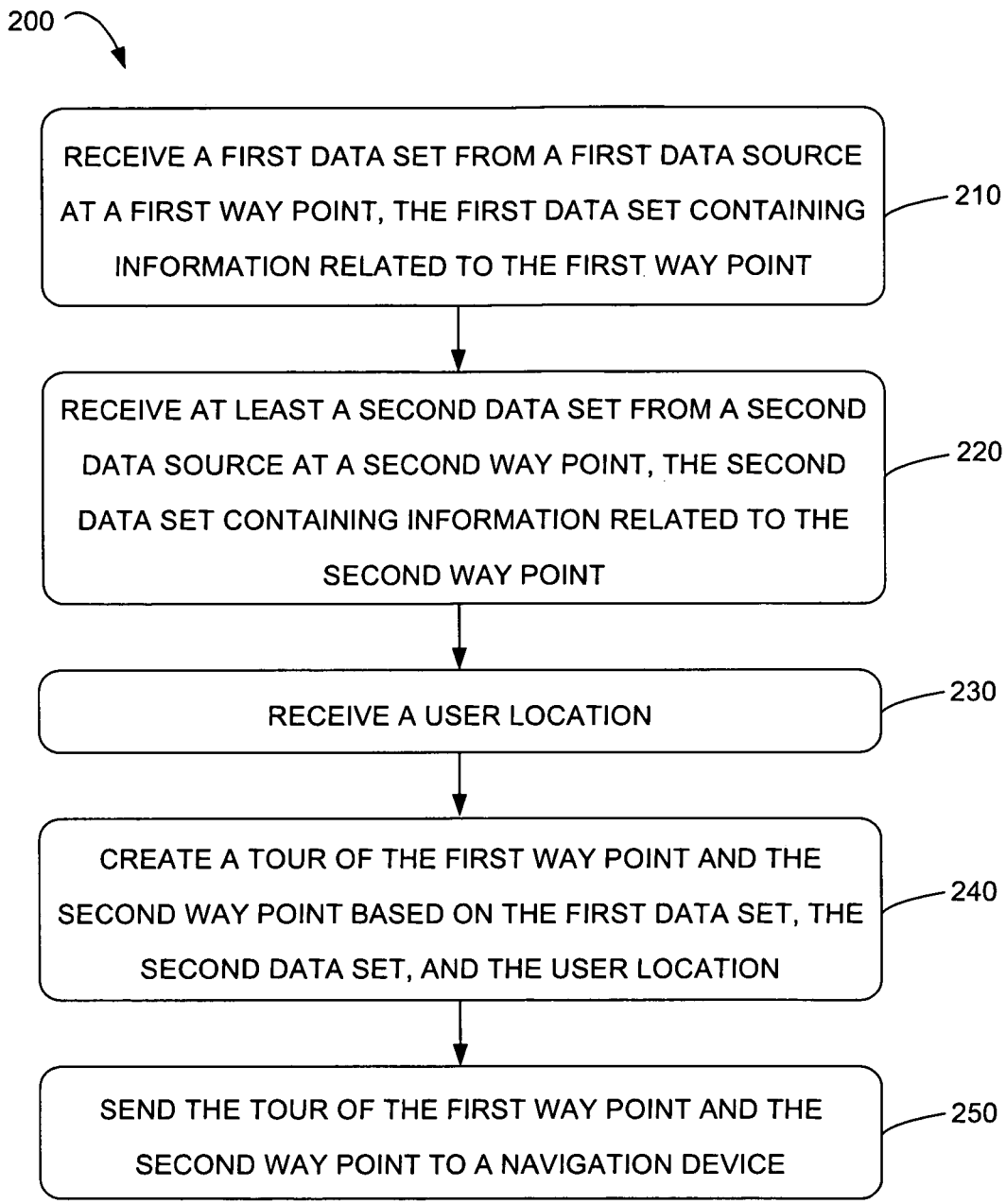
FIG. 2 shows a block diagram of embodiments of a method for combining data sets from a plurality of data sources to create a tour.

FIG. 2 shows a block diagram of an embodiment of a method 200 for combining data sets from a plurality of data sources to create a tour. First, as indicated in block 210, method 200 comprises receiving a first data set from a first data source at a first waypoint, the first data set containing information related to the first waypoint. For example, the first data source may be a calendar containing availability information related to the first waypoint. In this way, when scheduling a tour of waypoints, a user may be scheduled to visit a waypoint according to availability of a person or a service at that location.

Method 200 also comprises receiving at least a second data set from a second data source at a second waypoint, the second data set containing information related to the second waypoint, as indicated in block 220. Next, method 200 comprises receiving a user location, as indicated at 230. In block 240, the method comprises determining a tour of the first waypoint and the second waypoint based on the first data set, the second data set, and the user location. In block 250, method 200 then involves sending the tour of the first waypoint and the second waypoint to a navigation device.

In some embodiments, a method 200 may comprise receiving a change to one of the first data set and the second data set, and determining a new tour of the first waypoint and the second waypoint based on the change. In yet another embodiment, method 200 may comprise receiving a plurality of additional data sets from a plurality of additional data sources, the data sets each containing information related to a corresponding plurality of waypoints, and determining a tour of the first waypoint, the second waypoint, and the plurality of waypoints based on the first data set, the second data set, the plurality of additional data sets, and the user location.

In another example embodiment, method 200 may comprise providing routing information to each waypoint in the tour. In another example, method 200 may determine a tour based on a mode of transportation of a user. For example, if a user is on foot, a different sequence of the waypoints, or a different set of directions may be suggested than if the user was on a bike, in a car, etc.

In some embodiments, method 200 may further comprise generating a user profile containing information about user interests, and providing additional waypoints that correspond to the information in the user profile. In this way, an embodiment may provide additional waypoints that correspond to the information in the user profile. As an example, the information in the user profile may be retrieved from at least one of a response to a survey filled out by a user, from a social networking account, or from a community rating data store. A user may also provide authorization to access their account on a social networking site and a service may acquire the information from the site and use it in a user profile to find potential points of interest that may be suggested as potential waypoints in a tour.

Additionally, information in the user profile may be locations previously visited, ratings from community rating web-sites, searches conducted by a user, news sources, product purchases, previous routes to or between waypoints, in certain areas, etc. For example, a service may retain a history of routes for a user and suggest a previous route for a certain area, for a certain waypoint, etc.

In one example, a user profile may be generated for a tourist by the tourist filling out a questionnaire where the user specifies they are interested Spanish architecture, buildings, parks, and sandy beaches. Method 200 may utilize the user profile to generate a tour of destinations related to the interests in the user profile. An embodiment may then not only suggest some waypoints in a tour but may also check the availability of the waypoints and generate a tour according to user interests, availability of destinations, and the user's current location, as a non-limiting example.

FIG. 3 shows a chart 300 depicting a plurality of data sources and example use cases. Chart 300 includes data sources in the left most column including a user location, a user profile, calendar data, social networks, user ratings, previous routes, previous destinations, event information and updates, traffic information, and contacts location, as non-limiting examples. Additionally, some embodiments may include additional data sources not shown in FIG. 3.

Chart 300 also illustrates 4 example scenarios that may use all or a subset of the data sources in the left most column. The example scenarios include a salesman, a time management application, a logistics application, and a tourist. As illustrated, a tour for a salesman may use most of the data sources but not a user profile, a social network or a user rating. That is, some data sources may not be relevant information to generate a tour for some scenarios. By combining the information for a different set of data sources, a tour may be generated that is suitable for a particular scenario. In some embodiments, additional scenarios may be created and a tour generated according to the new scenarios. An example of each of the tourist scenario and the salesman scenario are described in the following paragraphs.

In a tourist example, a tourist may be visiting New York on a business trip and log their profile into a service network, such as server 180, and enter into a tour application running on a PND 190 or other mobile device. Tour module 150 may generate a list of tours for the user based on information mined from their profile. Each generated tour may be geo-located so that a starting point would be dynamically dependent on the tourist's current location. In this way, a user may select one of the suggested tours or in response to a search a suggested tour may show up on a map as a set of way-points with interactive media, as a non-limiting example.

Additionally, the tourist may also inject stops into a suggested tour, such as a meal break, or visit to a friend, a scheduled rest, a visit to their hotel room, etc. Waypoints may be added to an existing tour using a user interface, and can be automated by integration with the tourist's online calendar. As an example, a tourist may enter a lunch request at a specific time and a tour may be generated using interests from their profile, their current location, and restaurants that are open and close to a portion of an existing tour.

Another example may be a salesman in the business of delivering specialized construction equipment to different work sites. In this example, consider the salesman needs to deliver three pieces of equipment to three different locations, location A, location B, and location C in a city the salesman is unfamiliar with. On the morning of his scheduled deliveries, the salesman may input into a PND 190 the names of the three points of contact (POC) he's supposed to meet, one POC at each construction site. The PND 190 may then send this information to the computing device 110 which uses that information and calendar service 142 to analyze the calendars of each POC. An embodiment may then use the calendars to take into account the POCs schedules, the current and predicted road and traffic conditions, public events occurring in the area, etc., and then compute a suggested route or tour for the salesman to deliver the specialized construction equipment.

In this example, the salesman may be 20 minutes from reaching his first destination the calendar service 142 may detect that the first POC has modified their schedule to indicate a meeting the POC is going to run beyond the scheduled delivery time. In this example, the tour module may use this calendar information to develop a new tour that re-routes the salesman to location B and also make destination A the last destination on his delivery route. To continue the example, as the salesman approaches location B, the traffic service 146 may detect that a road has been closed due to a traffic collision and tour module 150 may re-routes the driver around the collision.

It will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, personal navigation devices, and any other suitable device that may be configured as a navigation device such as personal computers, servers, laptop computers, hand-held devices, cellular phones, microprocessor-based programmable consumer electronics, etc.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device that is in communication with a plurality of data sources and a navigation device, a method of combining data sets from the plurality of data sources to create one or more tours that include at least a first waypoint and a second waypoint, the method comprising:
receiving availability information from a calendar related to the first waypoint;
generating a user profile containing information about user interests;
receiving a user location;
determining a first tour that includes at least the first waypoint and the second waypoint arranged in a first sequence that is based on the availability information, the user profile information, and the user location;
sending the first tour that includes at least the first waypoint and the second waypoint to the navigation device;
receiving from one of the calendar and the user profile a change to one of the availability information and the user profile information;
in response to the change and without user input, determining a second tour that includes the first waypoint and the second waypoint arranged in a second sequence that is different from the first sequence and is based on the change;
in response to the change and without user input, sending the second tour that includes at least the first waypoint and the second waypoint to the navigation device; and
providing additional waypoints that correspond to the user profile information.

2. The method of claim 1, further comprising:
receiving a plurality of additional data sets from a plurality of additional data sources, the plurality of additional data sets each containing information related to a corresponding plurality of additional waypoints; and
determining a third tour that includes the first waypoint, the second waypoint, and the plurality of additional waypoints arranged in a third sequence that is different from the first sequence and the second sequence and is based on the availability information, the user profile information, the plurality of additional data sets, and the user location.

3. The method of claim 1, further comprising generating routing information to each waypoint in the first tour that includes at least the first waypoint and the second waypoint.

4. The method of claim 1, wherein determining the first tour that includes at least the first waypoint and the second waypoint is also based on a mode of transportation of a user.

5. The method of claim 1, further comprising providing media data that is related to the information in the user profile.

6. The method of claim 1, wherein the information in the user profile is retrieved from at least one of a response to a survey filled out by a user, from a social networking account, or from a community rating service.

7. A system for combining data sets to create one or more tours that include a plurality of waypoints corresponding to a plurality of data sources, the plurality of waypoints including a first waypoint and a second waypoint, the system with an input, a memory, and a processor in communication with the input and the memory, the system comprising:

a service module including a plurality of services each corresponding to a type of data set, the plurality of services including a calendar service, the service module configured to receive a plurality of data sets from the plurality of data sources that use at least one of the plurality of services, the plurality of data sets including availability information related to the first waypoint from a calendar that uses the calendar service;

a profile module configured to generate a user profile containing information about user interests;

a tour module to receive a user location and to receive the plurality of data sets from the service module and the user profile information from the profile module, the tour module comprising a sequence service that is configured to generate a first tour that includes the first waypoint and the second waypoint arranged in a first sequence that is based on the plurality of data sets, the user profile information, and the user location;

the system configured to send the first tour to a navigation device;

the service module further configured to receive from one of the calendar and the user profile a change to one of the availability information and the user profile information;

the tour module and the sequence service further configured to generate, in response to the change and without user input, a second tour that includes the first waypoint and the second waypoint arranged in a second sequence that is different from the first sequence and is based on the change;

the system further configured, in response to the change and without user input, to send the second tour that includes the first waypoint and the second waypoint arranged in the second sequence to the navigation device; and the profile module further configured to provide additional waypoints that correspond to the user profile information.

8. The system of claim 7, wherein the tour module is further configured to provide routing information to each waypoint in the first tour that includes the plurality of waypoints corresponding to the plurality of data sources.

9. The system of claim 7, wherein the first tour that includes the plurality of waypoints corresponding to the plurality of data sources is in part based on a mode of transportation of a user.

10. The system of claim 7, further comprising a recommendation service to provide media data that is related to the information in the user profile.

11. The system of claim 7, wherein the information in the user profile is retrieved from at least one of a response to a survey filled out by a user, from a social networking account, or from a community rating data store.

12. A computer-readable medium comprising instructions executable by a computing device to combine data sets from a plurality of data sources to create one or more tours that include at least a first waypoint and a second waypoint, the instructions being executable to perform a method comprising:

receiving availability information from a calendar related to the first waypoint;

generating a user profile containing information about user interests;

receiving a user location;

determining a first tour that includes at least the first waypoint and the second waypoint arranged in a first sequence that is based on the availability information, the user profile information, and the user location;

sending the first tour that includes at least the first waypoint and the second waypoint to a navigation device;

receiving from one of the calendar and the user profile a change to one of the availability information and the user profile;

in response to the change and without user input, determining a second tour that includes the first waypoint and the second waypoint arranged in a second sequence that is different from the first sequence and is based on the change; and providing additional waypoints that correspond to the user profile information.

13. The computer-readable medium of claim 12, further comprising instructions for providing media data that is related to the information in the user profile.

14. The computer-readable medium of claim 13, wherein the information in the user profile is retrieved from at least one of a response to a survey filled out by a user, from a social networking account, or from a community rating service.

* * * * *